United States Patent [19]

Moser

[11] 4,133,455

[45] Jan. 9, 1979

[54] WEIGHING APPARATUS FOR CONTINUOUSLY WEIGHING A PASSING LAYER OF FIBER MATERIAL IN A METERING DEVICE OF A SPINNING PREPARATORY MACHINE

[75] Inventor: Robert Moser, Winterthur, Switzerland

[73] Assignee: Rieter Machine Works Limited, Winterthur, Switzerland

[21] Appl. No.: 546,429

[22] Filed: Feb. 3, 1975

[30] Foreign Application Priority Data

Mar. 8, 1974 [CH] Switzerland ..................... 3266/74

[51] Int. Cl.² ................. G01G 11/04; G01G 11/12
[52] U.S. Cl. ........................... 222/77; 222/55; 222/254; 222/415; 177/16; 177/229; 177/DIG. 9; 198/504; 198/505; 198/834
[58] Field of Search .......... 222/55, 77, 254, 418; 177/16, 203, 229, DIG. 9; 198/193, 37, 39, 203, 504, 505, 834

[56] References Cited

U.S. PATENT DOCUMENTS

| 3,362,585 | 1/1968 | Nessim et al. ................. 222/55 |
| 3,679,010 | 7/1972 | Bullivant ...................... 222/55 X |
| 3,709,311 | 1/1973 | Appius ...................... 177/DIG. 9 X |
| 3,880,274 | 4/1975 | Bechtloff et al. .............. 198/193 X |

FOREIGN PATENT DOCUMENTS 490526 6/1970 Switzerland ...................... 222/55

*Primary Examiner*—Allen N. Knowles
*Assistant Examiner*—Frederick R. Handren
*Attorney, Agent, or Firm*—Werner W. Kleeman

[57] ABSTRACT

Weighing apparatus for continuously weighing a throughpassing layer of fiber material in a metering device of a spinning preparatory machine with two pairs of rolls arranged at a distance from one another for supplying the layer of fiber material to and for taking-off the layer of fiber material from a measuring zone between the pairs of rolls. There are provided two weighing plates, each of which is pivotable about an axle and connected with a measuring signal transmitter, the signal of which depends on the pivoting angle of the plate. An endless belt which contactingly glides across the weighing plates and which is driven at the speed of movement of the layer of fiber material is provided for transporting the layer of fiber material.

12 Claims, 4 Drawing Figures

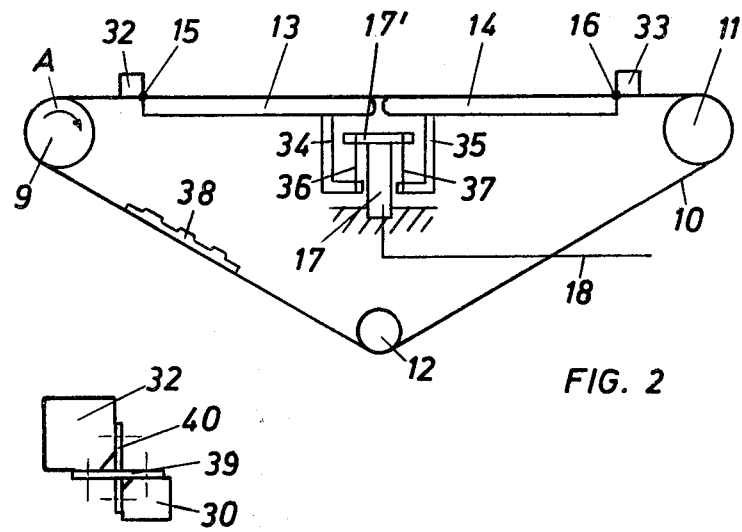
FIG. 2
FIG. 4
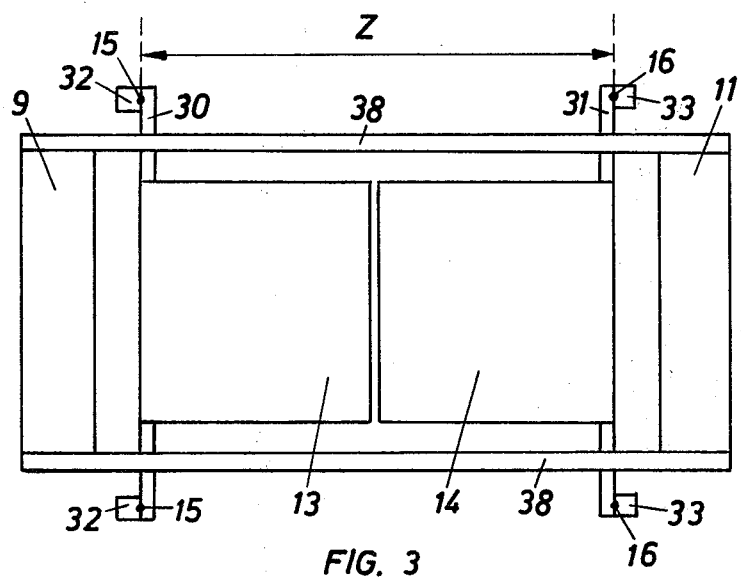
FIG. 3

WEIGHING APPARATUS FOR CONTINUOUSLY WEIGHING A PASSING LAYER OF FIBER MATERIAL IN A METERING DEVICE OF A SPINNING PREPARATORY MACHINE

BACKGROUND OF THE INVENTION

The present invention relates to a new and improved construction of weighing apparatus for continuously weighing a throughpassing layer of fiber material in a metering device of a spinning preparatory machine, said apparatus being of the type equipped with two pairs of rolls arranged at a distance from one another for supplying the layer of fiber material to and for taking-off the layer of fiber material from a measuring zone disposed between the pairs of rolls, and two weighing plates, each of which is pivotable about an axle and connected with a measuring signal transmitter the signal of which depends upon the pivoting angle of the plates.

The importance of the influence of the uniformity of a layer of fiber material supplied, in the form of a web or fiber layers, for instance to an opening or blending machine or a similar preparatory machine or to a card, upon the quality of not only the product directly delivered by such machines but also a desired end product fabricated from the processed fiber material is well known in the art. The variances, for example, in the quantity or the weight respectively, of a layer of fiber material to be supplied to the machines or weight differences between layers of fiber materials to be blended can not only cause disturbances in the blending ratio, but also in particular can bring about variable yarn counts in a yarn or similar products produced from the web or the fiber layers.

In Swiss Pat. No. 490,526 there is disclosed a weighing device which continuously meters a layer of fiber material which is continuously supplied to a a metering device and delivers the same at a constant production rate to a spinning preparatory machine. In this prior art device a layer of fiber material is supplied by a pair of feed rolls and is transported by a pair of transporting rolls through a measuring zone and after being measured is taken-off by a pair of delivery rolls. The aforementioned pairs of rolls are driven by a drive mechanism at speeds, the ratios of which relative to one another remain constant. In the measuring zone there is arranged a weighing device which measures the fiber weight and by means of a control device which is connected with the weighing device and the drive mechanism there is controlled the speed of the pairs of rolls.

The known weighing device located in the measuring zone between the pair of transporting rolls and the pair of delivery rolls consists of two weighing plates, the ends of which facing the respective pairs of rolls are arranged to be upwardly and downwardly pivotable about a hinge or pivot and the ends of which facing each other and located at approximately the middle of the measuring zone are downwardly angled or flexed. These downwardly angled ends are supported by the upper part of a measuring cell or box which through the agency of control devices controls the drive mechanism of the aforementioned pairs of rolls. If the weight of the layer of fibers deviates from the desired weight the weighing plates correspondingly pivot upward or downward in such a manner that the measuring cell indicates a value differing from a pre-set reference or desired value. This value measured at each moment is delivered to the control devices which correspondingly adapt or change the speed of the drive motor of the afore-mentioned pairs of rolls and thus change the quantity of fiber material which is supplied, transported through the measuring zone and delivered.

In this state-of-the-art weighing device it has been found that the friction forces exerted by the fiber layers gliding across the weighing plates are of considerable influence. These forces act in addition to the weight and irregularly influence the measuring process of the measuring cell and thus cause an undesirable and falsified control of the drive motor.

SUMMARY OF THE INVENTION

Hence, it is a primary object of the present invention to not only eliminate these disadvantages and limitations but to also provide an apparatus by means of which there is only continuously weighed the weight of a continuously supplied layer of fibers while excluding every disturbing influence or factor.

The weighing apparatus of this development is characterized by the features that there is provided an endless belt which contactingly glides across the weighing plates arranged therebetween and which belt is driven at the speed of the layer of fiber material for transporting the layer of fiber material.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is an enlarged detail of FIG. 1 shown in schematic side view;

FIG. 3 is a schematic top view of the weighing device according to FIG. 2, the transporting belt not being shown for better clarity in illustration; and FIG. 4 illustrates a friction-free cross-tape hinge.

DETAILED DESCRIPTION OF THE PREFERRED EMBODIMENTS

Figure 1:
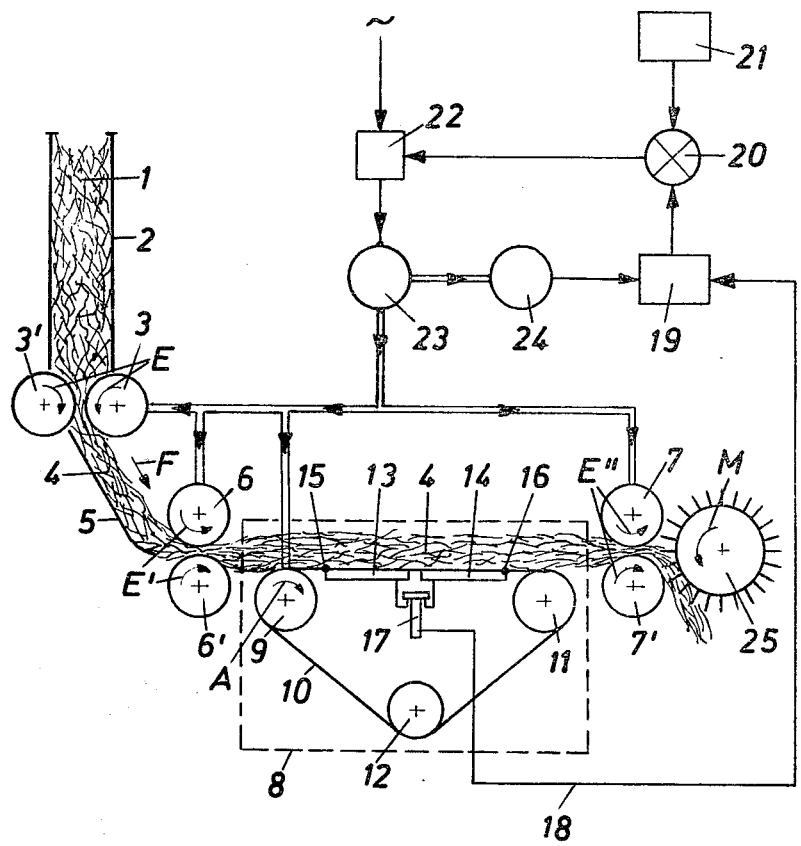
FIG. 1 is a schematic side view of a weighing apparatus in a metering device according to the invention.

Describing now the drawings, according to the showing of FIG. 1 fiber material 1 in flock form is supplied to a vertically arranged feed chute 2 which is provided at its lower end with a pair of take-off rolls 3, 3' rotating in the direction of the arrows E and withdrawing the fiber material 1 from the feed chute 2 in the direction of the arrow F. The withdrawn fiber material 1 is deposited in the form of a layer 4 of fiber material, which can be a web or layers of fibers, upon a guide element 5 arranged below the take-off rolls 3, 3'. Immediately adjacent to the guide element 5 there is arranged at the outlet end thereof a pair of supply rolls 6, 6' which rotate in the direction of the arrows E' and which rolls 6, 6' are followed by a pair of delivery rolls 7, 7' rotating in the direction of the arrows E". Between the respective pairs of rolls 6, 6' and 7, 7' there is arranged a weighing device 8. A driven roll 9 rotating in the direction of the arrow A drives a transporting or transport belt 10 which is guided over the rolls or rollers 11 and 12 which are not driven. Two weighing plates 13 and 14 are arranged to be pivotable about corresponding hinges or pivots 15 and 16 which are spatially fixed and the ends of the weighing plates 13 and 14 are operatively connected with a measuring or measurement value transmitter 17. The measuring value transmitter 17 which is constructed as a pressure measuring cell or box is connected via a line or conductor 18 with a multiplier or multiplicator 19. The multiplier 19 in turn is connected on the one hand through the agency of a comparator 20 with a desired or reference value presetting device 21 and a control device 22 for controlling a motor 23 and, on the other hand, is connected via a tacho-generator 24 with the motor 23. The motor 23 is — as schematically shown — drivingly connected with the rolls 3, 6, 7 and 9 and drives them at speeds which are in a constant relationship to one another.

The layer of fiber material 4 delivered by the take-off or delivery rolls 3, 3′ of the feed chute 2 to the supply rolls 6, 6′ in the direction of the arrow F is transported by the supply rolls 6, 6′ and the delivery rolls 7, 7′ across a measuring zone extending from the hinges or pivot means 15 to the hinges or pivot means 16. The transporting belt 10 transports the layer of fiber material 4 from the driven roll 9 to the roll 11 and therebetween glides or slides over the weighing plates 13 and 14. The weight of the layer of fiber material 4 supported by the weighing plates 13, 14 is transmitted as a displacement path or distance to the pressure or force measuring cell 17. The quantity of fiber material delivered per unit of time by the delivery rolls 7, 7′, i.e. the production P e.g. in kg per hour is calculated according to the following equation:

$$P = A \cdot V$$

wherein A is the supported weight in kg per meter (kg/m) and V is the speed with which the layer of fiber material is transported through the measuring zone in meters per hour (m/h). The supported weight A is measured in the measuring zone and the speed V is measured by the tacho-generator 24 connected with the drive motor 23. The supported weight A measured in the form of a displacement in the measuring cell is transformed in such cell into an electrical potential or voltage and via the conductor or line 18 is transmitted to the multiplier 19, to which there is also transmitted the speed V which likewise has been transformed into an electrical voltage. Both voltages at each moment are multiplied by the multiplier 19 and are compared in the comparator 20 with the desired or reference value preset in the presetting or setting device 21 which, as will be recalled, serves for presetting the reference value. Corresponding to any deviation from the reference value there is adjusted the speed of the drive motor 23 by means of the control device 22 through the agency of the comparator 20, i.e. the rotational speeds of the rolls 3, 6, 7 and 9 rotating at constant speed ratios are changed until the product A · V is equal to the desired or reference value.

The layer of fiber material 4 delivered by the delivery rolls 7, 7′ at a constant production rate is subsequently opened into fiber flocks by an opening roll 25 rotating continuously in the direction of the arrow M. Such fiber flocks are deposited upon a transporting belt (not shown) arranged below the opening roll 25 in the form of a second layer of fiber material onto a layer of fiber material which has already been deposited by another metering device and is e.g. supplied to an automatic blending machine. After departing from the delivery rolls 7, 7′ the layer of fiber material, however, could be directly supplied to a card.

In FIGS. 2 and 3 the weighing device 8 is separately shown. The weighing plates 13 and 14 are arranged on corresponding axles or shafts 30 and 31, each of which are pivotable about two corresponding friction-free hinges or pivots 15 and 16 and which pivots 15, 16 determine the length of the measuring zone Z. The axles or shafts 30 and 31 are connected via the hinges 15 and 16, which are formed by resilient or spring cross-band hinges or pivots, with corresponding support members 32, 33 of a machine frame which is not particularly shown. Towards the middle of the measuring zone Z angled elements 34 and 35 respectively are mounted on the weighing plates 13, 14 and at which angled elements 34, 35 there is anchored a respective corresponding spring steel wire 36, 37. The other end of the spring steel wires 36, 37 are attached to a horizontally arranged rod or beam forming the force measuring member 17′ of the weight or force measuring cell 17. Meshing with the ends of the rolls 9 and 11 are respective toothed belts 38 which are tensioned by a tension or tensioning pulley 12. The transporting or transport belt 10 is for instance adhesively connected to the two toothed belts 38, the transporting belt 10 not being shown in FIG. 3 for clarity of illustration.

The roll 9, which is provided at its ends where the toothed belts mesh with corresponding teeth (not shown), is driven by the drive motor 23 in the direction of the arrow A and drives without slippage the two toothed belts 38. The transporting belt 10 adhesively connected with the toothed belts 38 thus also moves without slippage at the same speed at which the layer of fiber material 4 is supplied by the pair of supply rolls 6, 6′. Since the pivoting axles or shafts 30, 31 are arranged in the plane of the transporting belt 10 no reaction force is transmitted onto the force measuring cell 17 during such time as the transporting belt 10 contacts the weighing plates 13, 14 and glides across them, because no torque or rotational moment acting on the force measuring cell 17 can be formed by the friction forces. The transporting belt 10 is, for instance, a very thin and highly flexible fabric which is fabricated without seams from polyester yarns in such a manner that possible influences of a protruding seam onto the weighing plates 13, 14 are prevented. The influence of the weight of the transporting belt 10 and the weighing plates is eliminated from the control circuit by appropriately selecting the zero setting of the reference value setting device 21. The weight of the layer of fiber material transported through the measuring zone Z continually presses upon the weighing plates 13, 14 which are pivotable about the hinges or pivots 15, 16. By means of the angled members 34, 35 and the spring steel wires 36, 37 this force is transmitted to the force measuring cell 17. Any deviation from the desired or reference production preset in the reference value setting device 21 is transformed in the control device 22 and by means of the drive motor 23 into a speed change until the deviation from the reference value becomes null.

After leaving the measuring zone Z the layer of fiber material 4 is transported over the roll 11 to the pair of delivery rolls 7, 7′. The two toothed belts 38 drive the roll 11 and are deflected by such roll. By means of the tensioning and deflecting roll 12 the toothed belts 38 and thus the transporting belt 10 are guided back to the motor-driven roll 9. In the measuring zone Z the two toothed belts 38 are appropriately supported in such a manner that they cannot act via the transporting belt 10 upon the weighing plates 13, 14. Owing to the three-point support 15, 15, 36 and 16, 16, 37 of the weighing plates 13 and 14 the measuring sensitivity increases towards the middle of the measuring zone Z in such a manner that disturbances at the ends of the measuring zone exert less influence. A force-displacement characteristic of a spring system always crosses the zero-point, i.e. it is free of hysteresis as long as the system operates within the elastic range. In the present case the force (i.e. the weight of the layer of fiber material) acting on the weighing plates is transformed via a spring or resilient system (mounting 15, 16, part of the pressure measuring cell) into a displacement in such a manner that the transmission of the weight is effected hysteresis-free, something which is necessary for a precise control.

In FIG. 4 the spring support or mounting of the axle or shaft 30 is shown in detail, and it is to be understood that a similar arrangement is provided for the other axle or shaft 31. A spring tape or band 39 is e.g. mounted by means of screws onto the axle or shaft 30 and onto the support 32. Behind the spring tape or band 39 and at right angles with respect to such spring band there is also mounted a spring band or tape 40 onto the axle or shaft 30 and onto the support 32. The two resilient or spring bands 39 and 40 collectively form a friction-free or frictionless cross-band or cross-tape hinge or pivot means.

The weighing plates are advantageously supported friction-free and elastically, on the one hand, in the pivoting axis by means of two hinges or pivots and, on the other hand, by means of a support acting upon the measuring transmitter in such a manner that there can be eliminated foreign influences upon the weight measurement of the layer of fiber material.

The transporting belt preferably possesses at each side a respective toothed belt, each meshing with a gear in such a manner that there is obtained a slippage-free drive of the transporting belt.

Undesirable influences of a protruding seam of the transporting belt acting upon the weighing plates can be avoided if there is used a seamless transporting belt.

If the pivoting axes of the weighing plates are arranged to coincide with the plane of the transporting belt, then the friction of the transporting belt on the weighing plates does not influence the measuring transmitter.

The weight of the transporting belt and of the weighing plates is preferably continually taken-up by the force measuring cell via a wire connecting each of the weighing plates with the force measuring member, so that by appropriately choosing the zero position of the reference value setting device it can be eliminated from the control circuit.

While there is shown and described present preferred embodiments of the invention, it is to be distinctly understood that the invention is not limited thereto but may be otherwise variously embodied and practiced within the scope of the following claims.

What is claimed is:

1. A weighing apparatus for continuously weighing a throughpassing continuous layer of fiber material in a metering device of a spinning preparatory machine, comprising two pair of rolls constituting a first pair of rolls and a second pair of rolls arranged in spaced relationship from one another and defining therebetween a measuring zone, said two pairs of rolls serving for supplying the layer of fiber material to and for removing the layer of fiber material from said measuring zone disposed between said spaced pairs of rolls, said rolls transporting the layer of fiber material across said measuring zone at a predetermined speed of movement, two weighing plates located in said measuring zone, means for mounting each of said weighing plates for pivotal movement about a respective pivot axis, a measuring signal transmitter operatively connected with said two weighing plates for generating a signal which depends upon the angle of pivoting of the weighing plates, a thin highly flexible endless transporting belt arranged to contactingly glide across the weighing plates for additionally transporting the layer of fiber material from the first pair of rolls to the second pair of rolls under elimination of irregular friction forces of said layer on said weighing plates, the sides of said thin transporting belt being connected with two endless driving belts arranged beyond the reach of said weighing plates and means for driving said driving belts and for controlling the speed of said transporting belt at substantially the predetermined speed of movement at which said rolls transport the layer of fiber material across the measuring zone.

2. The apparatus as defined in claim 1, wherein said pivotal mounting means for each weighing plate comprises two substantially frictionless hinge means for pivotably supporting the associated weighing plate at the region of its pivot axes and a frictionless support member acting upon the measuring signal transmitter.

3. The apparatus as defined in claim 2, wherein each hinge means incorporates an elastic member.

4. The apparatus as defined in claim 2, wherein each support member supporting the associated weighing plate at the measuring signal transmitter comprises an elastic member.

5. The apparatus as defined in claim 1, wherein the pivot axes of the weighing plates are arranged to substantially coincide with a plane containing the endless transporting belt.

6. The apparatus as defined in claim 1, wherein the weighing plates are positioned within the confines of said endless transporting belt.

7. The apparatus as defined in claim 1, wherein said two driving belts with the connected endless transporting belt are suspended between a driving roll and a guiding roll in close vicinity to the supplying rolls and removing rolls.

8. The apparatus as defined in claim 7, wherein said two driving belts connected with the endless transporting belt are toothed and can be driven without slippage.

9. The apparatus as defined in claim 8, wherein each of said two driving belts is adhesively connected with an associated side of the endless transporting belt.

10. The apparatus as defined in claim 9, wherein the endless transporting belt comprises a fabric.

11. The apparatus as defined in claim 10, wherein the endless transporting belt comprises a seamless belt.

12. A weighing apparatus for continuously weighing a throughpassing layer of fiber material in a metering device of a spinning preparatory machine, comprising two pairs of rolls arranged in spaced relationship from one another and defining therebetween a measuring zone, said two pairs of rolls serving for supplying the layer of fiber material to and for removing the layer of fiber material from said measuring zone disposed between said spaced pairs of rolls, two weighing plates located in said measuring zone, means for mounting each of said weighing plates for pivotal movement about a respective pivot axis, a measuring signal transmitter operatively connected with said two weighing plates for generating a signal which depends upon the angle of pivoting of the weighing plates, an endless transporting belt arranged to contactingly glide across the weighing plates for transporting the layer of fiber material, and means for driving said endless transporting belt substantially at the speed of movement of the throughpassing layer of fiber material, said pivotal mounting means for each weighing plate comprises two substantially frictionless hinge means for pivotably supporting the associated weighing plate at the region of its pivot axes and a frictionless support member acting upon the measuring signal transmitter, said measuring signal transmitter comprises a force measuring cell including a force measuring member which is connected with the weighing plates by a respective wire tensioned by the weight of the weighing plates and each wire defining said support member.

* * * * *